S. JENCICK.
MOTOR INDICATING MECHANISM.
APPLICATION FILED JULY 24, 1915.
1,298,049.
Patented Mar. 25, 1919.
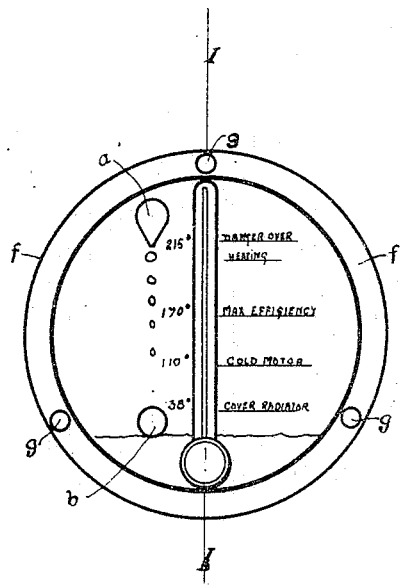
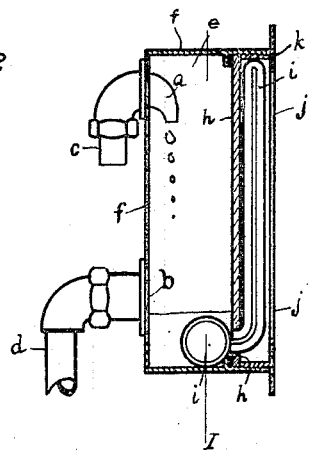
WITNESSES:
Elizabeth C. Kelly
Mona J Kaye
INVENTOR
STEPHEN JENCICK
BY
Gordon Grimes
ATTORNEY

UNITED STATES PATENT OFFICE.

STEPHEN JENCICK, OF MINNEAPOLIS, MINNESOTA, ASSIGNOR TO G. A. SCHANZE, OF MINNEAPOLIS, MINNESOTA.

MOTOR-INDICATING MECHANISM.

1,298,049.          Specification of Letters Patent.     Patented Mar. 25, 1919.

Application filed July 24, 1915. Serial No. 41,754.

*To all whom it may concern:*

Be it known that I, STEPHEN JENCICK, a subject of Austria, residing at the city of Minneapolis, in the county of Hennepin and State of Minnesota, have invented a new and useful Motor-Indicating Mechanism, of which the following is a specification.

My invention relates to improvements in systems for indicating the internal condition of internal combustion engines, and has for its objects to accurately indicate the temperature within the crank-case, and about the moving and working parts of such motors.

I attain these objects by the mechanism illustrated in the accompanying drawing, in which—

Figure 1 is a front elevation of the indicating part of my invention, and Fig. 2 is a vertical scetion of part of my mechanism on the line 1—1, Fig. 1. Similar letters refer to similar parts throughout the several views.

This indicating apparatus may be used upon all internal combustion motors having a circulating oiling system and is most accurate and efficient when used in connection with a force-fed oiling system in such motors.

Ports *a* and *b* are suitably connected with the circulating lubricant of the motor by tubes *c* and *d* so that the lubricant from the motor is constantly circulating through port *a*, which projects into chamber *e*, so that the quantity of circulating lubricant may be more plainly seen, drips to the bottom of chamber *e* and is conveyed through port *b* to the parts of the motor to be lubricated.

The indicating portion of the mechanism consists of a metal casing *f*, which is provided with suitable screw holes *g* for mounting upon the dash board of an automobile or upon any suitable mounting. Glass partition *h* forms an oil tight chamber *e* with casing *f* except for parts *a* and *b*. Thermometer *i* is positioned in the indicating mechanism with its bulb in chamber *e* and below port *b* so that the same is completely covered with circulating oil, and with its stem projecting through a suitable aperture in partition *h* and contained in chamber *j*, which is formed between case *f*, partition *h* and glass dust cover *k*. The thermometer may be sealed into the opening in partition *h* in any desired manner, such as by a suitable gasket, and may be graduated both in degrees and in directions to remedy and make safe any dangerous condition shown to exist in the motor.

By this mechanism, which is simple and cheap to construct, which may be located within easy visual distance of the operator of the motor, whether the same is used in an automobile, launch or in whatever other manner and which takes the place of the sight feed now commonly used in internal combustion motor lubricating systems, an accurate account of the degree of heat within the motor may be obtained.

The only systems of indicating motor trouble now in use are operated in connection with the liquid cooling medium of the motor and are so indirect that the only conditions they indicate are the absence of lubrication of the cylinder walls of the motor or the improper mixture of the combustion gases and each of these conditions are more accurately indicated by the carbureter adjustments, by such external conditions as the knocking of the motor, carbon in the exhausted gases, or by the sight feed oiler common in such engines.

On the contrary, the mechanism herein described indicates the heat condition within the motor by a circulating medium which is constantly in running contact with the vital and moving parts of the motor and indicates immediately any trouble in the bearings of the motor, the lubrication of the cylinders or any other real condition of danger.

Any test which relies upon the temperature of the cooling medium or steam or vapor generated by the heat of the motor therefrom, must be conceded to be of little practical value for it is a demonstrated fact that the ideal temperature condition for motors of this kind is far above that of the boiling point of any liquid cooling medium in use. Moreover such systems are not applicable to air cooled motors which are growing daily in popularity. Also a condition wherein the lower part of the circulating system was frozen or clogged and steam was being generated at the motor would not be as accurately indicated by a system depending upon the cooling fluid of the vapor above such fluid as by the system described herein.

I claim:

1. An indicating device for a motor having a circulating oiling system, comprising a casing having a chamber provided with an inlet opening for admitting oil from said system and an oil exit opening, one wall of said casing being transparent and forming a sight opening for viewing the flow of oil through said chamber, and means for indicating the temperature of the oil in said chamber.

2. An indicating device for a motor having a circulating oiling system, comprising a casing having a chamber provided with an inlet opening for admitting oil from said system and an oil exit opening, wall of said casing being transparent and forming a sight opening for viewing the flow of oil through said chamber, and a thermometer having its bulb in the oil in said chamber and its stem visible to indicate the temperature of the oil and the condition of the motor.

3. An indicating device for a motor having a circulating oil system, comprising a casing having an oil tight chamber and a thermometer chamber, connections for circulating oil through said oil chamber, one wall of said casing being transparent to view the flow of oil therethrough, and a thermometer having its stem in said thermometer chamber for indicating the temperature of oil in said oil chamber.

4. An indicating device for a motor having a circulating oil system, comprising a casing having an oil tight chamber and a thermometer chamber, connections for circulating oil through said oil chamber, one wall of said casing being transparent to view the flow of oil therethrough, and a thermometer having its bulb in said oil chamber and its stem in said thermometer chamber for indicating the temperature of said oil and the condition of the motor.

5. An indicating device for a motor having a circulating oil system, comprising a casing having an oil tight chamber and a thermometer chamber, connections for circulating oil through said oil chamber, one wall of said casing being transparent to view the flow of oil therethrough, and a thermometer having its bulb in said oil chamber and its stem in said thermometer chamber for indicating the temperature of said oil and the condition of the motor, one wall of said thermometer chamber being transparent to view the thermometer stem.

6. The combination with an oil circulating system for the motor of a motor vehicle, of means for simultaneously and separately indicating the temperature of the oil and the existence of pressure in said system.

STEPHEN JENCICK.

Witnesses:
GORDON GRIMES,
ELIZABETH C. KELLY.